United States Patent Office 3,317,561
Patented May 2, 1967

3,317,561
NEW HETEROCYCLIC ORGANO-PHOSPHATE COMPOUNDS
Stephen David Levy, Princeton, Roger Williams Addor, Pennington, and Richard Joseph Magee, Princeton, N.J., assignors to American Cyanamid Company, Stamford, Conn., a corporation of Maine
No Drawing. Filed July 18, 1963, Ser. No. 296,074
1 Claim. (Cl. 260—327)

The present application is a continuation-in-part of our copending application Ser. No. 283,976, filed May 29, 1963, now abandoned.

This invention relates to a new class of oxygen and sulfur heterocyclic organophosphorus compounds and method for the preparation thereof. More particularly, it relates to compounds and the preparation of such compounds having the general formula:

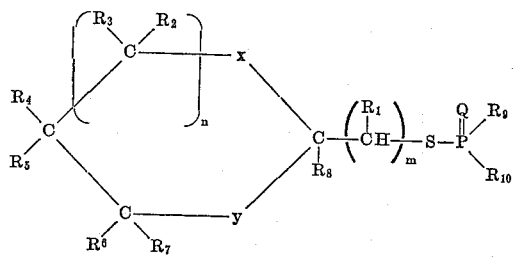

wherein $R_1$, $R_2$, $R_3$, $R_4$, $R_5$, $R_6$, $R_7$ and $R_8$ which may be the same or different, represent hydrogen, lower alkyl, halo (lower) alkyl, lower carbalkoxy, phenyl, a substituted phenyl or aralkyl, such as methoxyphenyl, sulfamoylphenyl, methylthiophenyl, nitrophenyl, cyanophenyl, carbalkoxyphenyl, carbamoylphenyl or benzyl; $R_9$ and $R_{10}$ which may be the same or different, represent lower alkyl, phenyl, lower alkoxy, alkylthio, or lower alkylamino radicals; Q, $x$ and $y$ represent sulfur or oxygen; $m$ is an integer from 1 to 2; and $n$ is an integer from 0 to 1.

The organophosphorus compounds of the present invention possess insecticidal, acaricidal and nematocidal activity. They can also be employed as ore-beneficiating reagents and as plasticizers.

In general, a compound as defined above, may be conveniently prepared by reacting initially an appropriate alkali metal salt of a phosphorodithioate with a halogenated carbonyl compound, such as a halogenated aldehyde or a halogenated ketone. The latter is then reacted with a diol, dithiol or monothioglycol in the presence of a ring-closing catalyst in a suitable non-aqueous medium to yield the corresponding heterocyclic alkyl ester of phosphorodithioic acid. Where compounds are prepared which have one or more sulfur atoms in the heterocyclic nucleus, the sulfur atom of that nucleus can be selectively oxidized by treatment of that compound with a suitable oxidizing agent, such as hydrogen peroxide or potassium permanganate. These reactions can be represented by the following equations:

[I]
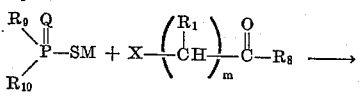

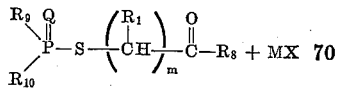

[II]

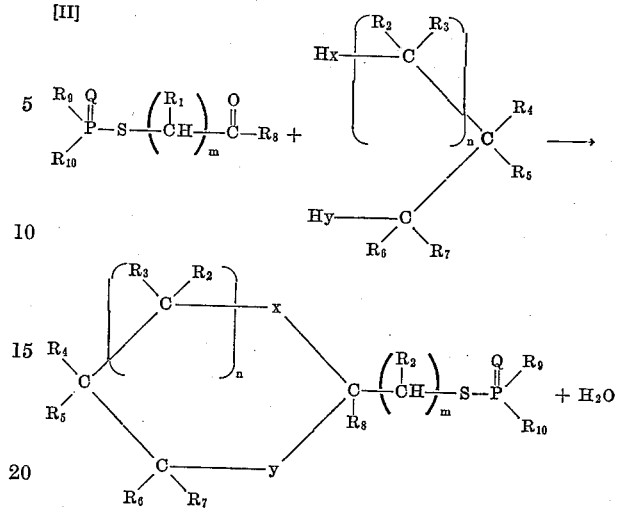

where all the R, Q, $x$, $y$, $m$ and $n$ values are the same as above, X is halogen, such as chlorine, bromine, iodine or fluorine, M is ammonium or an alkali metal such as sodium, potassium or lithium.

Illustrative ammonium and alkali metal salts of phosphorothioate reactants employed herein are: potassium O,O-dimethyl phosphoromonothioate, potassium O,O-dimethyl phosphorodithioate, sodium O,O-diethyl phosphorothioate, sodium O,O-diethyl phosphorodithioate, lithium O,O-diethyl phosphorodithioate, potassium O-methyl O-ethyl phosphorodithioate, lithium O,O-di-isopropyl phosphorodithioate, sodium O,O-di-n-butyl phosphorodithioate, potassium O,O-di-sec-pentyl phosphorodithioate, potassium O-ethyl N,N-dimethyl phosphoramidodithioate, sodium O-ethyl phenyl phosphonodithioate, lithium O-ethyl N-isopropyl phosphoramidodithioate, potassium O-ethyl N-methyl phosphoramidodithioate, ammonium O,S-diethyl phosphorotrithioate, sodium diethyl phosphinodithioate, isomers and homologs of the same.

Typical α-halogenated carbonyl compounds are: chloroacetaldehyde, 2-chloropropionaldehyde, β-chloropropionaldehyde, chloropropanone, β-chloroethyl methyl ketone, 2-chlorobutanone, 2-chloropentanone-3, α-chloroacetophenone, 3-bromobutanone-2, α-iodoacetophenone, 2-fluorobutanone, 1-bromo-1-m-chlorophenyl propanone, p-nitrophenacyl bromide, α-chloro-p-methoxy propionphenone, p-sulfamoylphenacyl bromide, p-methylthiophenacyl chloride, p-ethoxycarbonylphenacyl iodide, α-chloro-p-N-methylcarbamoyl butyrophenone, 2-bromo-1-phenyl butanone, ethyl chloropyruvate and 3-bromo-5-chlorobutanone-2.

The monothiol, dithiol and diol reactants employed hereinabove include illustratively: ethanedithiol, ethylene glycol, 2-mercaptoethanol, 1,2-propanedithiol, 1,3-propanedithiol, 3-mercaptopropanol-1, 2-methylpropanedithiol-1,3, 1,2-butanedithiol, 2,3-butanedithiol, 2-ethylpropanedithiol-1,3, methoxyphenylethanediol, 2,5-dimethylhexanedithiol-3,4, sulfamoylphenylethanedithiol, N-methylcarbamoylphenylethanedithiol, phenylethanedithiol, trimethylene glycol, ethyl 1,2-dimercaptopropionate, 2,3-dimercaptopropyl acetate, methylthiophenylethanedithiol, carbomethoxyphenylethanedithiol, cyanophenylethanedithiol, nitrophenylethanediol, and benzylethanedithiol.

Illustrative catalysts are: p-toluenesulfonic acid, gaseous hydrochloric acid, boron trifluoride etherate, zinc chloride, sulfuric acid and equivalents thereof.

It has been found that both illustrated reactions may be carried out in sequence without separation of the several reaction products, or they may be carried out stepwise. Advantageously, the reaction represented by the above Equation I is carried out in an appropriate inert solvent such as water, acetone or benzene. Similarly, Step II can be carried out in an inert solvent such as trichloromethane, trichloroethane or benzene. However, neither a ketone such as acetone or methyl isobutyl ketone, nor water can be utilized in the latter step.

Advantageously, above Equation I can be carried out alternatively, for instance, by reacting either a phosphoromonothioic acid or a phosphorodithioic acid with an unsaturated carbonyl compound, such as acrolein or methyl vinyl ketone.

In general, the phosphorothioates of the present invention can be prepared readily by each of the methods defined above. However, it has been further found that the class of phosphoromonothioates can be prepared alternatively by a novel series of steps involving the reactions between (a) a carbonyl disulfide such as acetonyl phenyl disulfide, or acetonyl o-nitrophenyl disulfide, and a monothiol or dithiol as defined above, and (b) thereafter treating the resultant product with a trialkyl phosphite such as triethyl phosphite or trimethyl phosphite.

To facilitate a further understanding of the invention, the following illustrative examples are presented. These are not to be taken as limitative of the invention.

EXAMPLE 1

*Preparation of O,O-diethyl S-1-oxa-3-sulfolan-2-ylmethyl phosphorodithioate*

A mixture of 1.14 parts of O,O-diethyl S-1,3-oxathiolan-2-ylmethyl phosphorodithioate, 10 parts of benzene, 5 parts water and 5 parts of glacial acetic acid is vigorously stirred in a suitable flask. A solution of 2.05 parts of potassium permanganate in 50 parts water is slowly dropped into the mixture over a forty-minute period maintaining the temperature at 25° C. During the reaction, manganese dioxide separates from the solution. The mixture is stirred for one hour at 25° C. and excess permanganate and manganese dioxide reacts with a saturated sodium bisulfite solution to a colorless "end point" at 20° C. Ten parts of benzene are added and the mixture is separated. Recovered organic layer is washed with 10 parts of dilute bisulfite solution and twice with 10 parts of ice water and then dried over magnesium sulfate. The solvent is removed under reduced pressure yielding 1.07 parts of light-yellow liquid having a refractive index $(n_D^{25})=1.5366$. Molecular distillation is carried out at 0.002 mm. Hg to yield the product which analyzes:

Calculated for $C_8H_{17}O_5PS_3$: C, 29.99; H, 5.35; P, 9.67; S, 30.03. Found: C, 29.87; H, 5.49; P, 9.26; S, 29.54.

Substituting hydrogen peroxide for potassium permanganate in the above example, it is found that a good yield of the corresponding O,O-diethyl S-1-oxa-3-sulfolan-2-ylmethyl phosphorodithioate is obtained.

EXAMPLE 2

Representative compounds illustrated by structure in the table below are diluted with a mixture of 65–35 acetone-water, respectively, to produce the several tabulated concentrations. To test for protection against aphids, pots containing two or three Nasturtium plants two inches tall are infested with Nasturtium aphids two days before they are selected for testing. The pots are placed on a turntable and the plants are sprayed with a test compound. It is observed that the percent kill of the aphids for each concentration given in the table below is high. Typical values are shown.

To test for effectiveness against two-spotted spider mites, sieva lima bean plants with the first pair of leaves three to four inches in size are infested about five hours before testing, using about 100 to 200 adult mites per leaf. The infested leaves are dipped in the test solution (in four inch crystallizing dishes) for three seconds, and the plants are set in the hood to dry. The treated plants are held for two days at 80° F. and 60% relative humidity. The adult mite mortality is then calculated by counting dead and alive adults on one leaf under the 10× binocularscope. The other leaf is held an additional five days and is then examined at 10× power to estimate the kill of eggs and newly hatched nymphs, giving a measure of ovicidal and residual action, respectively.

TABLE I

| Structure | Percent Kill Aphids Concentration (percent) | | | | Percent Kill Mites Concentration (percent) | | | |
|---|---|---|---|---|---|---|---|---|
| | .1 | .01 | .001 | .0001 | .1 | .01 | .001 | .0001 |
| $(C_2H_5O)_2\overset{S}{\overset{\|}{P}}-SCH_2-\underset{O}{\underset{\diagdown\diagup}{\big|}}-SO_2$ | 100 | 100 | 100 | 85 | 100 | 100 | 100 | 100 |
| $(C_2H_5O)_2\overset{S}{\overset{\|}{P}}-SCH_2-\big\langle\begin{smallmatrix}S-\\S-\end{smallmatrix}\big\rangle$ | 100 | 100 | 100 | 0 | 100 | 100 | 100 | 0 |

We claim:
O,O-diethyl S-1-oxa-3-sulfolan-2-ylmethyl phosphorodithioate.

References Cited by the Examiner
UNITED STATES PATENTS

| | | | |
|---|---|---|---|
| 2,690,988 | 10/1954 | Jones et al. | 260—327 |
| 2,701,253 | 2/1955 | Jones et al. | 260—327 |
| 2,815,350 | 12/1957 | Speck | 260—327 |
| 3,025,214 | 3/1962 | Eden | 260—327 |
| 3,066,149 | 11/1962 | Slezak et al. | 260—327 |
| 3,247,223 | 4/1966 | Walsh | 260—327 |

WALTER A. MODANCE, *Primary Examiner.*

NICHOLAS S. RIZZO, *Examiner.*

JAMES A. PATTEN, *Assistant Examiner.*